US007938896B2

(12) United States Patent
Paterson et al.

(10) Patent No.: US 7,938,896 B2

(45) Date of Patent: May 10, 2011

(54) AIR CLEANER INCLUDING TOUCH POINTS

(75) Inventors: Christopher M. Paterson, Biloxi, MS (US); Dennis T. Lamb, Long Beach, MS (US); Bruce Kiern, Gulfport, MS (US); Owen T. Bourgeois, Pass Christian, MS (US); Paul Moshenrose, Ocean Springs, MS (US); Shane Cohen, Potomac, MD (US)

(73) Assignee: Oreck Holdings, LLC, Cheyenne, WY (US)

( * ) Notice: Subject to any disclaimer, the term of this patent is extended or adjusted under 35 U.S.C. 154(b) by 1251 days.

(21) Appl. No.: 11/502,983

(22) Filed: Aug. 10, 2006

(65) Prior Publication Data

US 2008/0034976 A1 Feb. 14, 2008

(51) Int. Cl.
*B01D 49/00* (2006.01)

(52) U.S. Cl. .................. 96/417; 96/26; 96/148; 96/423; 55/385.1; 55/466; 55/DIG. 12; 55/DIG. 34

(58) Field of Classification Search .................... 55/466, 55/467, 471, 472, DIG. 34, DIG. 12, 385.1; 96/417, 148, 423, 26
See application file for complete search history.

(56) References Cited

U.S. PATENT DOCUMENTS

| | | | | |
|---|---|---|---|---|
| 3,635,001 | A * | 1/1972 | Komroff et al. | 96/417 |
| 4,410,934 | A | 10/1983 | Fathauer et al. | |
| 5,556,448 | A * | 9/1996 | Cheney et al. | 95/6 |
| 5,924,780 | A * | 7/1999 | Ammon et al. | 312/223.2 |
| 6,494,940 | B1 * | 12/2002 | Hak | 96/224 |
| 2005/0188853 | A1 * | 9/2005 | Scannell, Jr. | 96/417 |
| 2006/0277875 | A1 * | 12/2006 | Schuld | 55/484 |

FOREIGN PATENT DOCUMENTS

GB 1130494 A 10/1968

* cited by examiner

*Primary Examiner* — Frank M Lawrence
*Assistant Examiner* — Karla Hawkins
(74) *Attorney, Agent, or Firm* — Winston & Strawn LLP

(57) ABSTRACT

An air cleaner including touch points is provided according to an embodiment of the invention. The air cleaner includes a chassis and one or more visually coded touch points on the chassis. The one or more visually coded touch points include indicia of user-contactable components of the air cleaner.

22 Claims, 9 Drawing Sheets

AIR CLEANER INCLUDING TOUCH POINTS

TECHNICAL FIELD

The present invention relates to an air cleaner, and more particularly, to an air cleaner including touch points.

BACKGROUND OF THE INVENTION

Air cleaners are widely used for removing foreign substances from the air. The foreign substances can include pollen, dander, smoke, pollutants, dust, etc. In addition, an air cleaner can be used to circulate room air. An air cleaner can be used in many settings, including at home, in offices, workrooms, etc.

An air cleaner can include any type of mechanical filter element comprising a mesh, a weave, a foam, etc. An air cleaner can further include electrical air cleaning components, such as a collector cell that removes dirt and debris from the airflow of the air cleaner. A collector cell can comprise an ionizer and/or an electrostatic precipitator.

The electrostatic precipitator and the ionizer operate by creating high-voltage electrical fields, typically in excess of 5,000 volts. Dirt and debris in the air becomes ionized when it is brought into this high voltage electrical field by an airflow. Charge plates or electrodes in the electrostatic precipitator air cleaner, such as positive and negative plates or positive and ground plates, create the electrical field and one of the electrode polarities attracts the ionized dirt and debris. Because the electrostatic precipitator comprises electrodes or plates through which airflow can easily and quickly pass, only a low amount of energy is required to provide airflow through the electrostatic precipitator. As a result, foreign objects in the air can be removed efficiently and effectively.

The ionizer can comprise charge wires and ground plates, wherein the ionizer charges particles in the airflow before the airflow enters the electrostatic precipitator. The charging of the particles can neutralize or kill living organisms. The ionized particles of the airflow are subsequently attracted to ground potential surfaces. As a result, the electrically charged dirt and debris is more likely to be pulled out of the airflow when the airflow passes through the electrostatic precipitator.

Periodically, the collector cell can be removed and cleaned. Therefore, the air cleaner must include some manner of access door that allows persons to access internal components. The door further allows removal of the collector cell and the other filter elements for cleaning, replacement, or other maintenance. However, the high operational voltage level of a collector cell presents a safety concern in that it presents a significant danger of shock or electrocution.

The prior art has drawbacks. The prior art does not provide visually coded components that show the user the components that can be removed for cleaning, maintenance, or replacement. In addition, the prior art does not provide visually coded components that show the user any retainer devices holding in a component. Further, the prior art does not provide visually coded components that show the user safe or proper places to touch or grasp components of the air cleaner.

SUMMARY OF THE INVENTION

An air cleaner including touch points is provided according to an embodiment of the invention. The air cleaner comprises a chassis and one or more visually coded touch points on the chassis. The one or more visually coded touch points comprise indicia of user-contactable components of the air cleaner.

An air cleaner including touch points is provided according to an embodiment of the invention. The air cleaner comprises a chassis, an external shell substantially covering the chassis and including at least one access door, and one or more visually coded touch points on the chassis. The one or more visually coded touch points comprise indicia of user-contactable components of the air cleaner. The door exposes the one or more visually coded touch points when the door is open.

A method of forming an air cleaner including touch points is provided according to an embodiment of the invention. The method comprises providing a chassis and providing one or more visually coded touch points on the chassis. The one or more visually coded touch points comprise indicia of user-contactable components of the air cleaner.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1-6 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
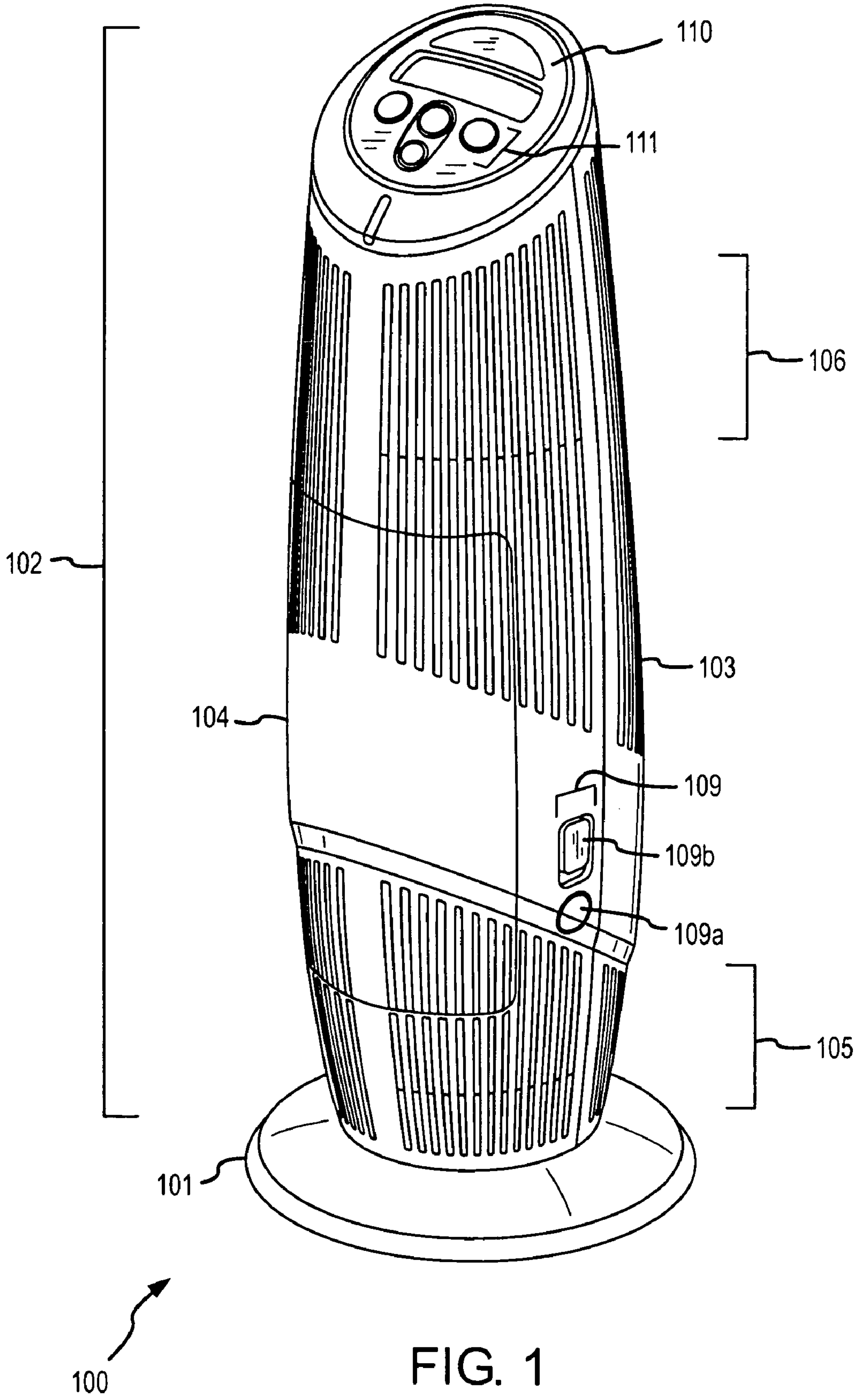
FIG. 1 shows an air cleaner according to an embodiment of the invention.

FIG. 1 shows an air cleaner 100 according to an embodiment of the invention. The air cleaner 100 in the embodiment shown includes a base portion 101 and a tower portion 102. The tower portion 102 can be generally vertically positioned and elongate in shape. In one embodiment, the tower portion 102 can be substantially cylindrical in shape. However, it should be understood that the air cleaner 100 can comprise any configuration, such as substantially rectangular, substantially round, a tower, etc. The air cleaner 100 can comprise a floor air cleaner model, a tabletop air cleaner model, a portable or personal air cleaner model, etc.

The tower portion 102 includes an external shell 103, one or more doors 104, and a control panel 110. The tower portion 102 further includes an air inlet 105 and an air outlet 106. Air is drawn in through the air inlet 105, is cleaned inside the tower portion 102, and the cleaned air is exhausted from the air outlet 106. However, it should be understood that the air cleaner 100 can comprise other shapes, configurations, and designs, and the tower configuration is shown merely for illustration.

The air inlet 105 is shown as being at the lower end of the tower portion 102. However, it should be understood that alternatively the relative positions of the air inlet 105 and the air outlet 106 could be interchanged.

The air cleaner 100 includes a door latch 109 including a push button 109*a* and a slider 109*b*. One or both of the push button 109*a* and the slider 109*b* can be color coded to the control panel 110. For example, one or more of the various buttons 111 of the control panel 110 can be visually coded to the door latch 109. Alternatively, indicator lights and/or indicator light legends (not shown) of the control panel 110 can be additionally visually coded to the door latch 109.

Figure 2:
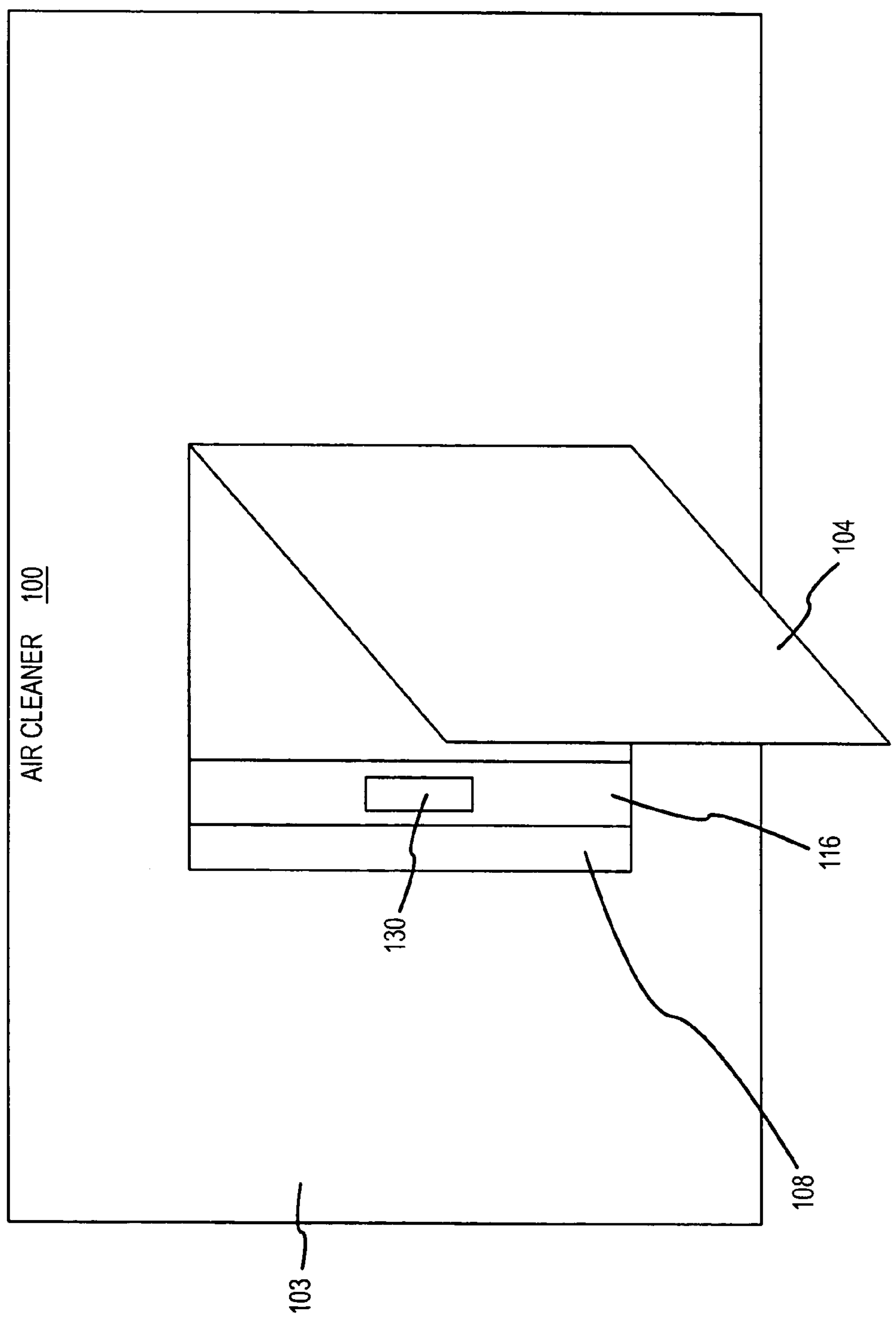
FIG. 2 shows at least a portion of the interior components of the air cleaner according to an embodiment of the invention.

FIG. 2 shows at least a portion of the interior components of the air cleaner 100 according to an embodiment of the invention. The door 104 is open in this figure to show the interior components. In this embodiment, the air cleaner 100 further comprises a chassis 108 that holds at least one air cleaning component 116. The air cleaning component 116 includes one or more visually coded touch points 130. It should be understood that the chassis 108 can hold multiple air cleaning components 116 (see FIGS. 3-4 and 6).

The chassis 108 can comprise any manner of structure. The external shell 103 substantially covers the chassis 108. The door 104 allows a user to access at least a portion of the chassis 108 and the at least one air cleaning component 116.

The air cleaning component 116 can comprise any manner of air cleaning component, including mechanical filter elements such as a mesh, weave, foam, particles or fibers, etc. Alternatively, the air cleaning component 116 can comprise filter elements that remove odors, volatile organic compounds (VOCs), or ozone from an airflow passing through the air cleaner 100. In yet another alternative, the air cleaning component 116 can use electrical power to neutralize living organisms and/or remove dirt and debris from the airflow.

For example, the air cleaning component 116 can comprise an ionizer, an electrostatic precipitator, or a collector cell comprising a combined pre-ionizer and electrostatic precipitator. Such an air cleaning component 116 removes dirt and debris from the airflow by means of a high voltage electric field. An electrostatic precipitator includes charge and ground plates. A high voltage potential across the plates negatively charges particles present in the airflow, wherein the charged particles are attracted to the ground plates. An ionizer includes one or more ionizer wires or other electrodes, wherein particles present in the airflow are charged by the electrodes. The ionizer can comprise one or both of a pre-ionizer or a post-ionizer. The charging of the particles can neutralize or kill living organisms. In addition, the charged particles, after exiting the air cleaner 100, will be attracted to various surfaces around the home and will be pulled out of the air.

The one or more visually coded touch points 130 comprise one or more visually differing regions that are easily differentiated from other portions or components of the air cleaner 100. Consequently, a person who opens the door 104 can immediately visually determine components of the air cleaner 100 that can be accessed and/or removed for cleaning, maintenance, and/or replacement. In addition, the person can immediately visually identify handles, grip devices, retainer devices or latches, etc., that can be grasped and manipulated for purposes of removing the corresponding air cleaning component. Further, the person can immediately visually identify air cleaner portions that are safe to touch and will not subject the person to any danger of electrical shock, for example.

The one or more visually coded touch points 130 can comprise a visually coded color. Where multiple touch points 130 exist, each visually coded touch point 130 can comprise a color that contrasts from the other coded portions or components of the air cleaner 100. Each visually coded touch point 130 can comprise a unique color or can comprise a common color. The color can be distinguished by values of chroma, saturation, intensity, luminance, shade, and/or tint. In addition, touch points 130 can visually differ in terms of color contrast.

Alternatively, the one or more visually coded touch points 130 can comprise variations in surface finish. For example, the finish can include gloss finishes, matte finishes, flat finishes, etc., or combinations thereof.

In another alternative, the one or more visually coded touch points 130 can comprise a visually coded texture. The visually coded texture can include, for example, textures such as roughening, grooving, dimpling, hatching, etc.

In yet another alternative, the one or more visually coded touch points 130 can comprise variations in patterns. The patterns can include black and white patterns, color patterns, surface texture patterns, or combinations thereof.

It should be understood that if the air cleaner 100 includes more than one door 104, each door can reveal one or more visually coded touch points 130. Each door can repeat the visual coding presented by other doors or can present visually unique touch points.

Figure 3:
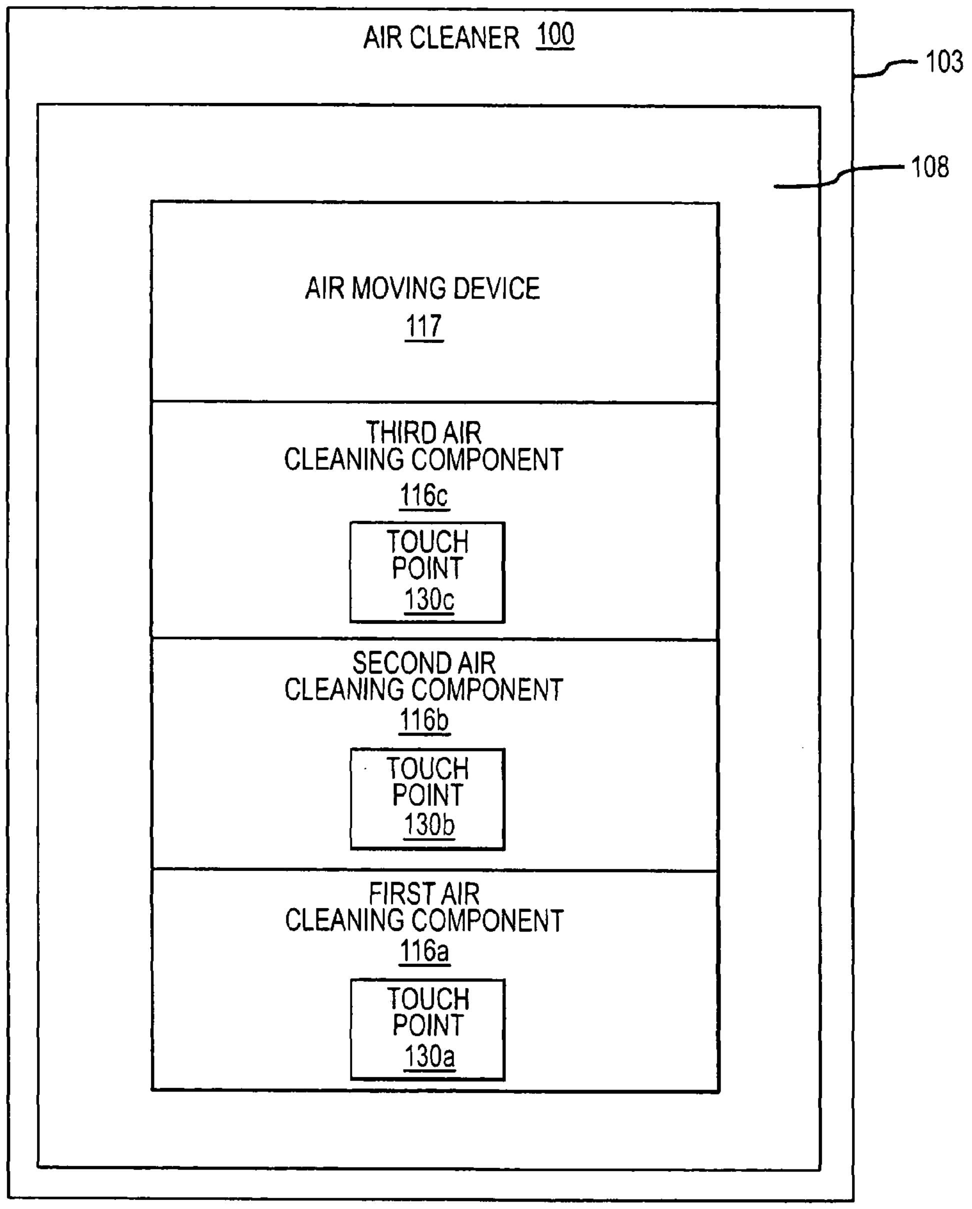
FIG. 3 shows the air cleaner according to an embodiment of the invention.

FIG. 3 shows the air cleaner 100 according to an embodiment of the invention. In this embodiment, the air cleaner 100 includes a first air cleaning component 116*a*, a second air cleaning component 116*b*, and a third air cleaning component 116*c*. The figure further shows an air moving device 117 that creates an airflow through the first air cleaning component 116*a*, the second air cleaning component 116*b*, and the third air cleaning component 116*c*. The air moving device 117 can comprise a motor and fan, for example.

In this embodiment, the first air cleaning component 116*a* includes at least one first touch point 130*a*, the second air cleaning component 116*b* includes at least one second touch point 130*b*, and the third air cleaning component 116*c* includes at least one third touch point 130*c*. It should be understood that each air cleaning component can include more than one touch point. The touch points 130*a*-130*c* function to visually differentiate the respective air cleaning components 116*a*-116*c* from the chassis 108 and from other portions or components of the air cleaner 100.

Figure 4:
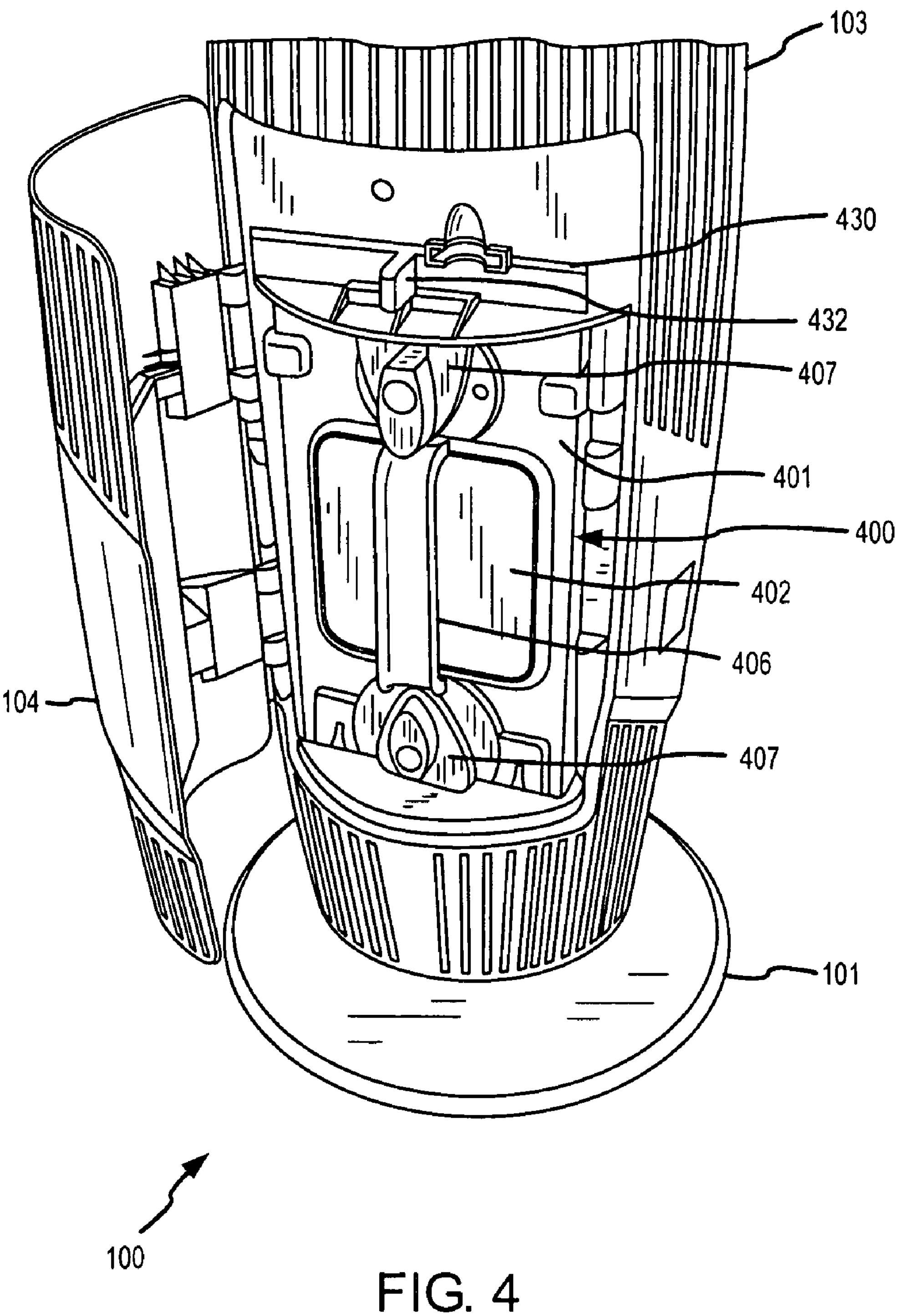
FIG. 4 shows the air cleaner according to an embodiment of the invention.

FIG. 4 shows the air cleaner 100 according to an embodiment of the invention. In this embodiment, the air cleaner 100 includes an electrostatic precipitator assembly 400 and a post filter 430 installed in the chassis 108.

In the embodiment shown, the electrostatic precipitator assembly 400 includes an electrostatic precipitator cell 402 held in a frame 401, with the frame 401 including a handle 406 and one or more retainer devices 407. The one or more retainer devices 407 engage a portion of the chassis 108 (see FIG. 5 and the accompanying discussion below). The one or more retainer devices 407 therefore retain the electrostatic precipitator assembly 400 within the air cleaner 100. The handle 406 can be used to grasp the electrostatic precipitator assembly 400 and can be used to insert and remove the electrostatic precipitator assembly 400 from the air cleaner 100.

In the embodiment shown, the one or more retainer devices 407 comprise two retainer devices 407. In addition, the two retainer devices 407 comprise visually coded touch points. As a result, when the door 104 is opened, a person can see that operation of the two retainer devices 407 is essential for removing the electrostatic precipitator assembly 400.

The post filter 430 includes a grip portion 432. The grip portion 432 must be squeezed in order to release tabs or projections that lock the post filter 430 into a receptacle in the air cleaner 100. The front surface of the post filter 430, including the grip portion 432, comprises a visually coded touch point. The visual coding of the post filter 430 and the grip portion 432 indicate to a person that the post filter 430 comprises a user-removable component of the air cleaner 100.

Figure 5:
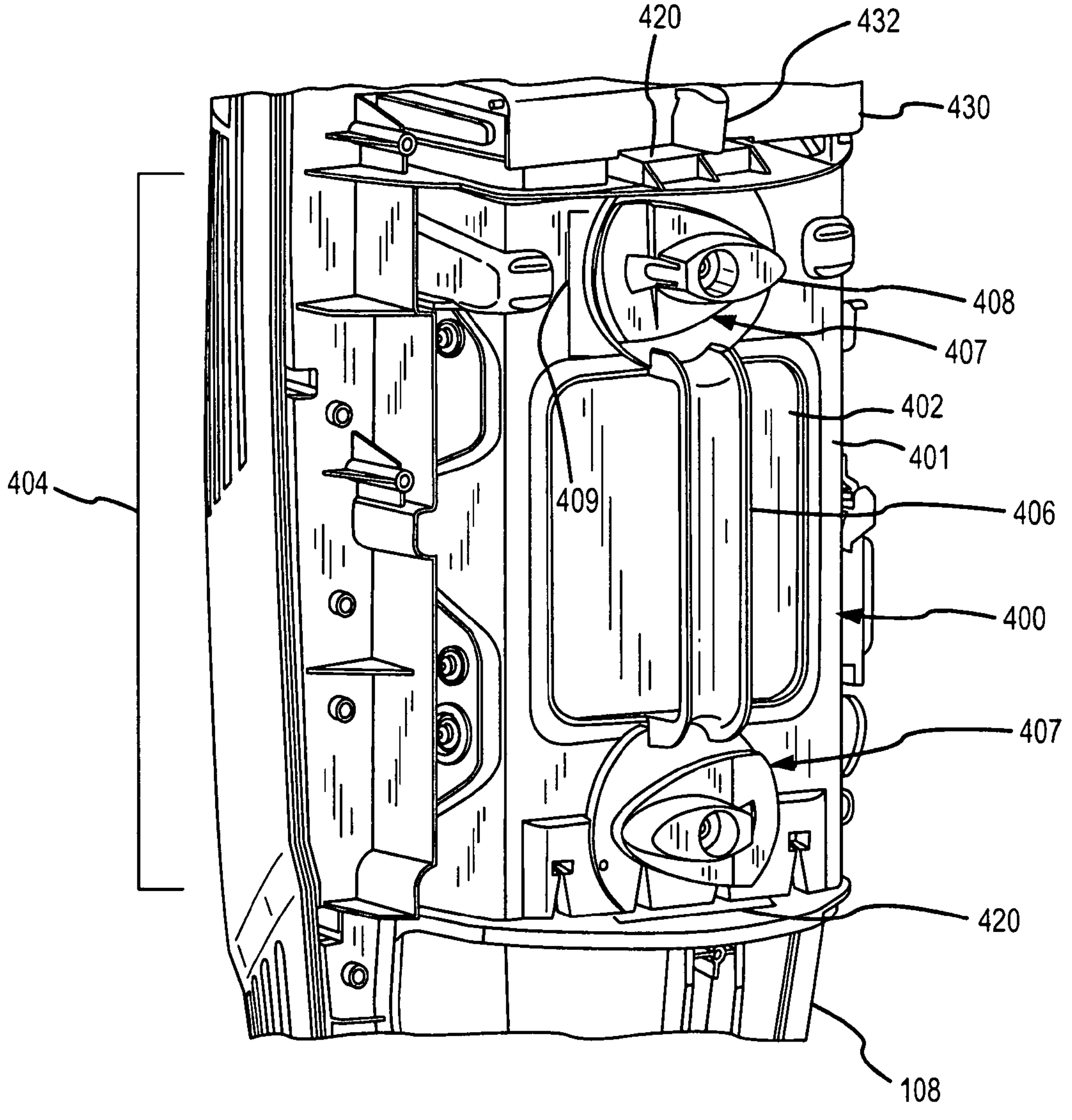
FIG. 5 shows a partially assembled air cleaner according to an embodiment of the invention.

FIG. 5 shows a partially assembled air cleaner 100 according to an embodiment of the invention. In this figure, the electrostatic precipitator assembly 400 is fully inserted into the air cleaner chassis 108 and fits into an electrostatic precipitator receptacle 404.

In one embodiment, the one or more retainer devices 407 comprise one or more rotatable retainer devices 407. The one or more retainer devices 407 can removably affix the electrostatic precipitator assembly 400 in an electrostatic precipitator receptacle 404 by engaging the air cleaner chassis 108. Consequently, the electrostatic precipitator assembly 400 cannot vibrate or otherwise move out of position in the electrostatic precipitator receptacle 404. Therefore, a person has to disengage the one or more retainer devices 407 in order to remove the electrostatic precipitator assembly 400.

The one or more retainer devices 407 are rotatably attached to the frame 401, such as by fastener devices, for example. The one or more retainer devices 407 include a handle portion 408 and a substantially arcuate wedge portion 409. The handle portion 408 can be used to grasp and rotate the retainer device 407. The wedge portion 409 fits into a corresponding aperture 420 in the air cleaner chassis 108. When the one or more retainer devices 407 are rotated in order to engage one or more apertures 420 of the air cleaner chassis 108, the electrostatic precipitator assembly 400 is firmly held in the electrostatic precipitator receptacle 404. The wedge portion 409 comprises a portion of increasing thickness that ensures that the retainer device 407 contacts the sides of the aperture 420 and ensures that the retainer device 407 is frictionally held in the aperture 420.

Figure 6:
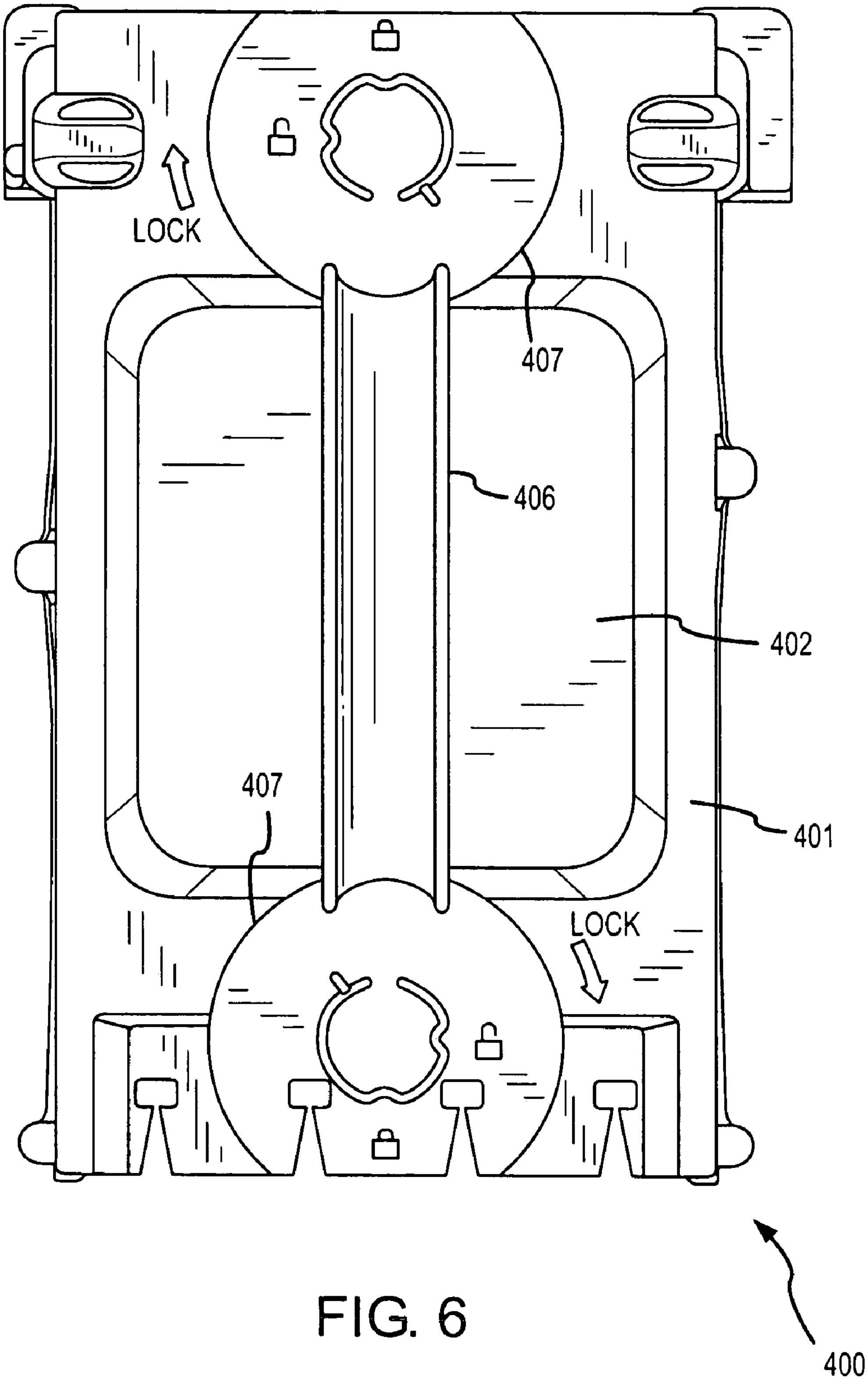
FIG. 6 shows the electrostatic precipitator assembly according to an embodiment of the invention.

FIG. 6 shows the electrostatic precipitator assembly 400 according to an embodiment of the invention. The electrostatic precipitator assembly 400 in this embodiment includes legends that instruct the user on operation of the retainer devices 407. The electrostatic precipitator assembly 400 includes arrows and the word "lock" to show the user the direction to rotate the retainer devices 407 in order to place the retainer devices 407 in the locked position. In addition, the electrostatic precipitator assembly 400 includes locked and unlocked symbols that indicate both positions of the retainer devices 407.

When the retainer devices 407 are in the lock position, they hold the electrostatic precipitator assembly 400 firmly in the air cleaner 100. The retainer devices 407 cannot be jiggled or vibrated out of the lock position. Conversely, when the retainer devices 407 are in the unlock position, the electrostatic precipitator assembly 400 can be easily removed from and inserted into the air cleaner 100. In addition, in the unlock position, the retainer devices 407 are kept out of the way during washing, allowing the electrostatic precipitator assembly 400 to be set down flat on a surface.

The retainer devices 407 can include detents at one or both of the locked and unlocked positions. The detents operate to substantially hold a retainer device 407 at the detent position in the absence of a predetermined rotational force. The detents in some embodiments cooperate with the wedge portion 409 in order to retain the electrostatic precipitator assembly 400 in the air cleaner 100. The detents can be formed on a retainer device 407, can be formed as part of the frame 401, or can be assembled to either.

Figure 7:
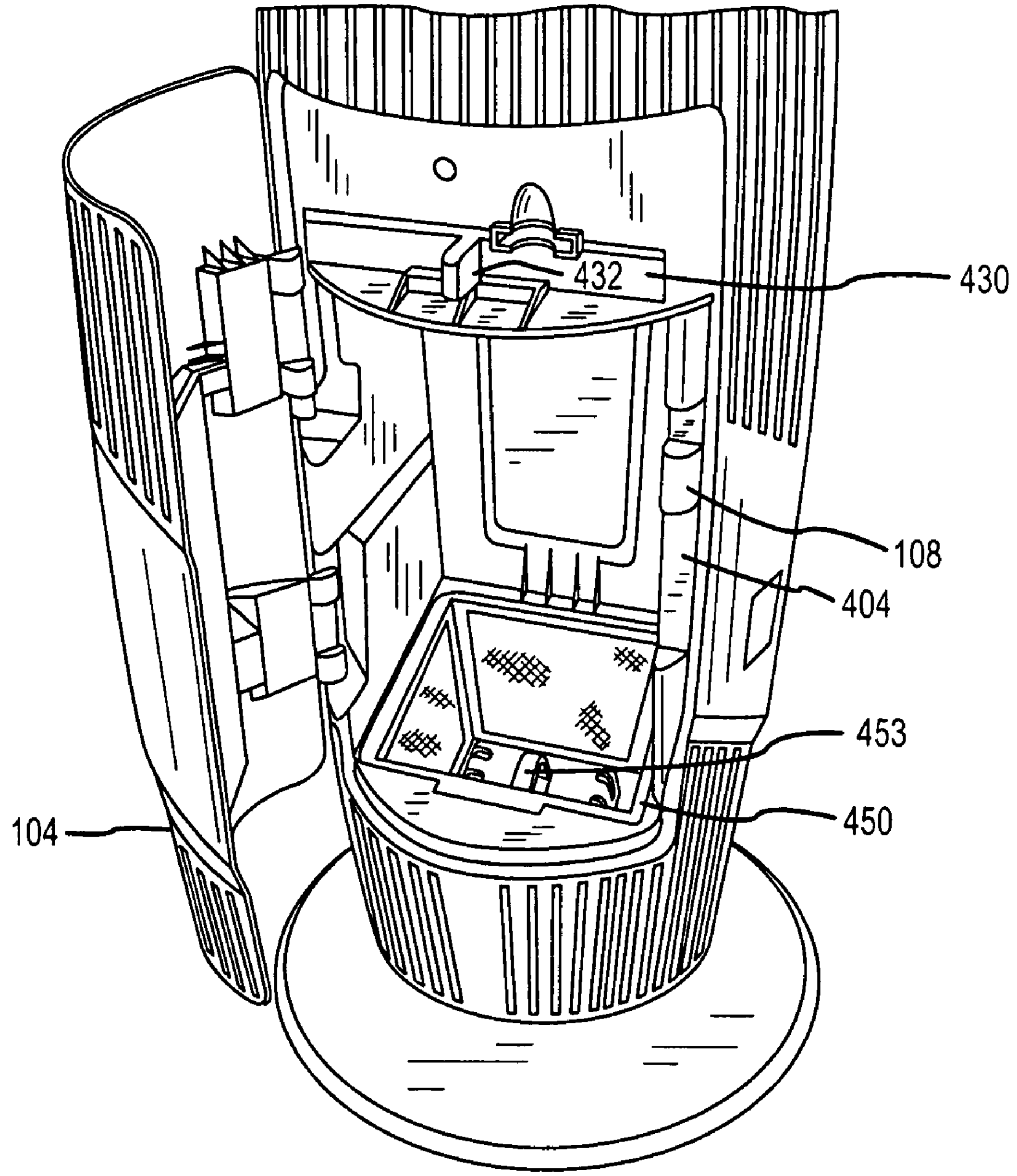
FIG. 7 shows the air cleaner without the electrostatic precipitator assembly of FIG. 4.

FIG. 7 shows the air cleaner 100 without the electrostatic precipitator assembly 400 of FIG. 4. This figure further shows a pre-filter assembly 450. The pre-filter assembly 450 in this embodiment resides below the electrostatic precipitator assembly 400 and incoming airflow first passes through the pre-filter assembly 450. As before, the pre-filter assembly 450 can comprise a visually coded touch point. The visual coding of the pre-filter assembly 450 informs a user that the pre-filter assembly 450 can be removed for cleaning, repair, and/or replacement. For that purpose, the pre-filter assembly 450 can further include a handle 453. Alternatively, just the handle 453 can be visually coded as a touch point.

Figure 8:
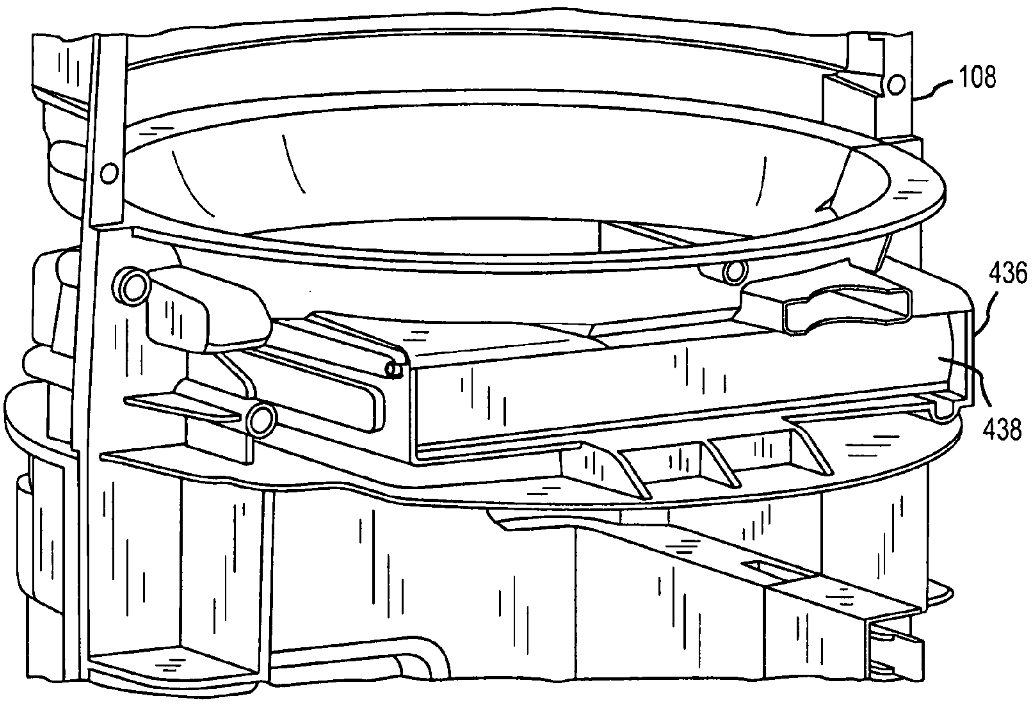
FIG. 8 shows a portion of the chassis including a post-filter receptacle.

FIG. 8 shows a portion of the chassis 108 including a post-filter receptacle 436. The post-filter receptacle 436 includes a spring-loaded door 438. In the absence of the post filter 430 being installed in the post-filter receptacle 436, the spring-loaded door 438 will assume the closed position, blocking the post-filter receptacle 436. This minimizes air leakage in the case where the air cleaner 100 is operated without the post filter 430.

The spring-loaded door 438 can be visually coded to the post filter 430. The visual coding therefore indicates to a user where the post filter 430 is to be installed. The spring-loaded door 438 and the post filter 430 therefore comprise a visually coded component and a correspondingly visually coded receptacle. In addition, the spring-loaded door 438 can carry a label, such as "Odor Absorber Compartment Empty", in order to draw the user's attention that the post filter 430 should be installed.

Figure 9:
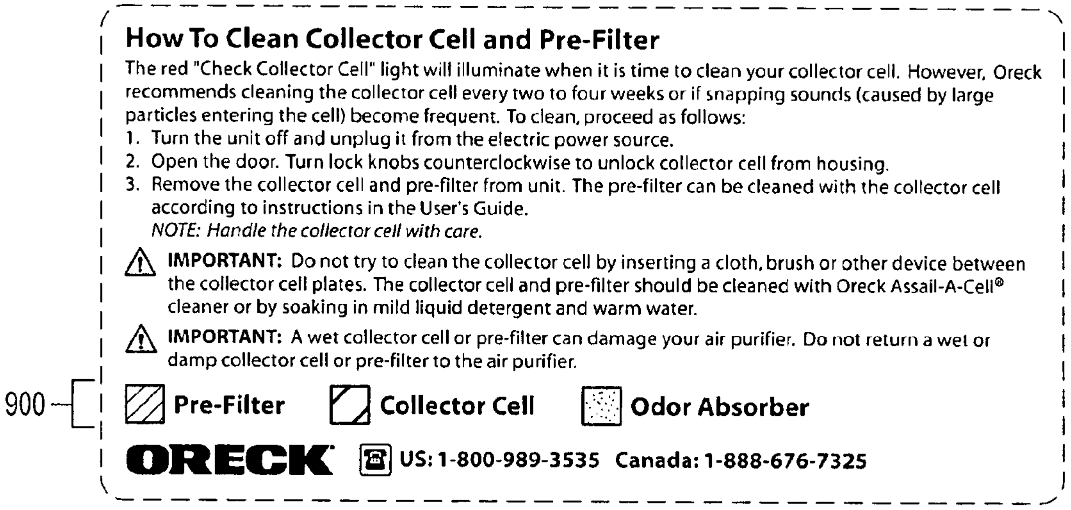
FIG. 9 shows a door label of the air cleaner according to an embodiment of the invention.

FIG. 9 shows a door label 700 of the air cleaner 100 according to an embodiment of the invention. The door label 700 can be affixed to an inner surface of the door 104. The door label 700 can include visually coded labels that correlate components of the air cleaner 100 to their names, such as a coding key 900. The coding key 900 can assist a user in identifying components and in following an accompanying users manual, for example. The door label 700 can also include cleaning instructions for one or more of the visually coded components of the coding key 900.

What is claimed is:

1. A method of accessing an air cleaner component including touch points, the method comprising:

providing a chassis and an external shell substantially covering the chassis and including a door; and accessing a user-removable high voltage air cleaner component within the chassis by touching one or more visually coded touch points disposed on the removable component, wherein the one or more visually coded touch points are configured to be user-contactable, visually distinct and safe to touch.

2. The method of claim 1, with the one or more visually coded touch points comprising one or more of color coded, finish coded, texture coded, or pattern coded surface.

3. The method of claim 1, further comprising providing a label including a coding key.

4. The method of claim 1, with a touch point of the one or more visually coded touch points comprising a grip portion.

5. The method of claim 1, with a touch point of the one or more visually coded touch points comprising a handle.

6. The method of claim 1, with a touch point of the one or more visually coded touch points comprising a retainer device.

7. The method of claim 1, with the one or more visually coded touch points comprising a visually coded component and a correspondingly visually coded receptacle.

8. The method of claim 1, further comprising providing one or more retainer devices that retain the user-removable high voltage air cleaning component to the chassis.

9. The method of claim 1, further comprising providing an external shell substantially covering the chassis and including a door and wherein the door exposes the one or more visually coded touch points when the door is open.

10. The method of claim 3, further comprising using the coding key to determine which visually coded touch point to access.

11. An air cleaner comprising:

a chassis including receptacles;

a door;

a first removable air cleaning component within the chassis adapted to receive electrical power, with the first removable air cleaning component comprising a first region that is visually distinct and safe for a user to touch;

a second removable air cleaning component within the chassis, with the second removable air cleaning component comprising a second region that is visually distinct and safe to touch;

wherein the first region is visually distinct from the second region;

wherein the removable components are adapted to be disposed within the receptacles and are exposed when the door is open.

12. The air cleaner of claim 11, wherein the first or second region further comprises a retaining device adapted to retain the first or second air cleaning component within the chassis.

13. The air cleaner of claim 11, further comprising a spring-loaded door disposed on one of the receptacles, wherein the spring-loaded door is adapted to close an opening of the one of the receptacles in the absence of one of the removable air cleaning components.

14. The air cleaner of claim 11, further comprising a label including a coding key which identifies the one or more visually coded touch points.

15. The air cleaner of claim 11, wherein the first removable air cleaning component comprises an electrostatic precipitator.

16. The air cleaner of claim 11, wherein the second removable air cleaner component comprises a post-filter or a pre-filter.

17. The air cleaner of claim 11, further comprising a third removable air cleaning component.

18. The air cleaner of claim 11, wherein one of the receptacles comprises a region that is visually distinct and safe for a user to touch, and wherein the one region of the receptacles matches the first region.

19. The air cleaner of claim 11, wherein the first region or the second region comprises a coded color, a surface finish, a texture, a pattern, or combinations thereof.

20. The air cleaner of claim 19, wherein the coded color can be distinguished by chroma, saturation, intensity, luminance, shade, tint, or contrast.

21. The air cleaner of claim 11, further comprising an air moving device.

22. A method of accessing an air cleaner component including touch points, the method comprising:

providing a chassis and an external shell substantially covering the chassis and including a door;

accessing a removable air cleaner component within the chassis by touching one or more visually coded touch points disposed on the removable air cleaner component, wherein the one or more visually coded touch points are configured to be user-contactable, visually distinct and safe to touch; and providing a label with cleaning instructions for the removable air cleaner component.

* * * * *